3,393,208
6H-BENZO[5,6]CYCLOHEPT[1,2,3-cd]INDOLIN-1,6-DIONES
Janis Plostnieks, Philadelphia, Pa., assignor to McNeil Laboratories, Incorporated, a corporation of Pennsylvania
No Drawing. Filed Oct. 22, 1965, Ser. No. 502,271
20 Claims. (Cl. 260—247.2)

ABSTRACT OF THE DISCLOSURE

The compounds are of the class of 6H-benzo[5,6]cyclohept[1,2,3-cd]indolin-1,6-diones which are useful as ultraviolet light absorbers and hypotensive agents.

This invention relates to novel organic compounds and more particularly to certain 6H-benzo[5,6]cyclohept[1,2,3-cd]indolin-1,6-diones and to the preparation thereof.

The novel 6H-benzo[5,6]cyclohept[1,2,3-cd]indolin-1,6-diones of this invention may be represented by the following structural formula:

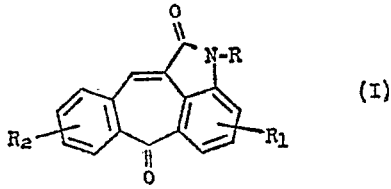

(I)

wherein R is a member selected from the group consisting of hydrogen, lower alkyl, aralkyl, hydroxy-lower alkyl, halo-lower alkyl, lower alkoxy-carbonyl-lower alkyl, N,N-disubstituted amino-lower alkyl, and

—CH$_2$CH$_2$—X in which X is a member selected from the group consisting of cyano, amino and lower alkyl-amino; $R_1$ is a member selected from the group consisting of hydrogen, lower alkyl, lower alkoxy, hydroxy and halo; and $R_2$ is a member selected from the group consisting of hydrogen, halo and lower alkoxy.

As used herein, lower alkyl and lower alkoxy preferably have from 1 to 5 carbon atoms, including straight or branch saturated aliphatic chains, such as, for example, methyl, ethyl, propyl, isopropyl, butyl, isobutyl, pentyl and the like, and, respectively, methoxy, ethoxy, propoxy, isopropoxy, etc.; and halo includes chloro, bromo, fluoro and iodo. The preferred aralkyl is benzyl. Among the N,N-disubstituted amino-lower alkyls that are operable herein are di-(lower alkyl)-amino-lower alkyl, e.g. 2-(dimethylamino)ethyl, 2-diethylamino)-ethyl, 2-(methylethylamino)ethyl, 3-(dimethylamino)-propyl, 3-(dipropylamino)propyl, β-dimethylamino-β-methyl-ethyl, and the like; and B=N— lower alkyl groups in which B=N— comprises a 5- to 6-membered saturated hetero-monocyclic amino, N being a hetero nitrogen atom thereof and B being an alkylene chain thereof which may be interrupted by one or more other heteroatoms such as aza, thia or oxa, e.g., morpholinomethyl, pyrrolidinylmethyl, piperidinomethyl, N'-(lower alkyl)-piperazinylmethyl, morpholinoethyl and the like.

The novel compounds of Formula I absorb ultraviolet light and, accordingly, can be employed as effective U.V. screens when incorporated in suitable vehicles such as transparent film-forming compositions and oils. In addition, several of the compounds have useful pharmacological properties. For example, when R, $R_1$ and $R_2$ are hydrogen, hypotensive activity is observed, as evidenced by the lowering of blood pressure in anesthetized dogs. Hypotensive activity is also evident when R is hydroxy-lower alkyl, preferably hydroxymethyl, and when R is di-(lower alkyl)-amino-lower alkyl, preferably dimethylaminopropyl.

The subject compounds of Formula I, wherein R is hydrogen, lower alkyl or aralkyl, may be advantageously prepared by using an appropriate 3-phthalidyl-2-indolinone (II) as the starting material, the tautomeric forms of which may be illustrated as follows (R'=H, alkyl, aralkyl):

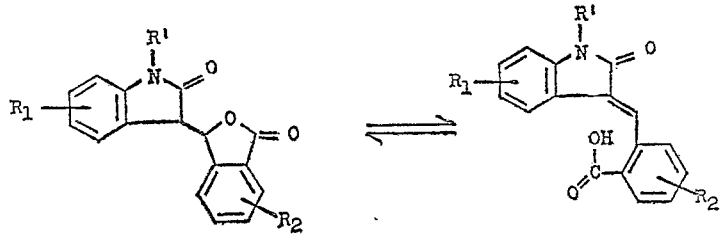

(II)

By the cyclodehydration of (II), which may be achieved under acidic dehydrating conditions, e.g., with anhydrous hydrofluoric acid, polyphosphoric acid and the like, the corresponding subject compounds (I–a) are obtained, wherein R' is hydrogen, lower alkyl or aralkyl. The cyclodehydration step is preferably conducted in polyphosphoric acid (PPA) at elevated temperatures of about 150–200° C., and, preferably, at 155–175° C. The reaction scheme may be illustrated as follows:

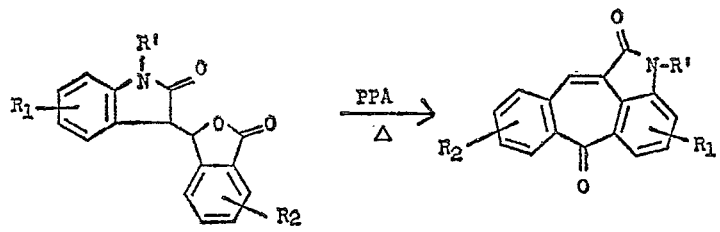

(II)  (I-a)

The 6H-benzo[5,6]cyclohept[1,2,3-cd]indolin-1,6-diones of this invention, wherein the nitrogen in the 2-position is unsubstituted and $R_1$ is other than hydroxy, hereinafter occasionally referred to as N-unsubstituted indolinediones, are preferably used for the introduction of such R groups as hydroxy-lower alkyl, halo-lower alkyl, lower alkoxy-carbonyl-lower alkyl, N,N-disubstituted amino-lower alkyl and —$CH_2CH_2$—X, as previously described. Introduction of such groups in the case where $R_1$ is hydroxy is advantageously accomplished by first protecting the hydroxy group, for example, by conventional acylation with acyl halides, e.g., acetyl chloride, benzyloxycarbonyl chloride and the like, followed by introduction of the desired R group in the 2-position, and subsequently removing the protecting group by conventional hydrolytic or hydrogenolytic techniques.

Introduction of lower alkoxy-carbonyl-lower alkyl and N,N-disubstituted amino-lower alkyl groups may be accomplished through alkylation by the corresponding halide, such as, for example, a lower alkoxy-carbonyl-lower alkyl halide or an N,N-disubstituted amino-lower alkyl halide. Typical examples of such halides are ethyl bromoacetate, propyl chloroacetate, dimethylamino-propyl chloride, dimethylamino-isopropyl chloride, diethylaminoethyl chloride, morpholinoethyl chloride and the like. The N-unsubstituted indolinedione is preferably used in the form of its alkali metal salt, which may be obtained by treatment with a strongly basic non-hydroxylic agent such as an alkali metal hydride, for example, sodium hydride, lithium hydride and the like; alkali metal amides, for example, sodamide, lithamide and the like; and alkali metal alkoxides, for example, sodium ethoxide, potassium t-butoxide and the like. The alkylation step is preferably performed in an anhydrous nonhydroxylic organic solvent such as, for example, the dialkylformamides, e.g., dimethylformamide, diethylformamide and the like; aromatic hydrocarbons such as, for example, benzene, toluene, xylene and the like; mixtures of said dialkylformamides and said aromatic hydrocarbons; and ethers such as tetrahydrofuran and 1,2-dimethoxy-ethane. Elevated temperatures may be advantageously employed. Similar treatment of the N-unsubstituted indolinedione with ethylenimine or N-lower alkyl-ethylenimine, e.g., N-methyl-ethylenimine, N-ethyl-ethylenimine and the like, affords the subject compounds (I) wherein R is β-aminoethyl and β-(lower alkyl-amino)-ethyl, respectively.

Condensation of the N-unsubstituted indolinedione with formaldehyde and a secondary amine affords an alternative method, by way of a Mannich-type reaction, of preparing those compounds of Formula I wherein R is an N,N-disubstituted amino-methyl group. By using the appropriate secondary amine, such as, for example, a di-(lower alkyl)amine or a 5- to 6-membered saturated heterocyclic amine, e.g., morpholine, pyrrolidine and the like, the corresponding N,N-disubstituted amino-methyl substituent in the 2-position of the starting indolinedione is obtained. Suitable solvents for such reactions include the alkanols and pyridine.

Introduction of a cyanoethyl group onto the ring nitrogen is readily accomplished by treatment of the N-unsubstituted indolinedione with acrylonitrile in a suitable solvent such as dimethylformamide and in the presence of an alkaline catalyst, e.g., an alkali metal hydroxide, alkoxide, amide, hydride and the like.

The hydroxymethyl group may be introduced onto the ring nitrogen by reaction of the N-unsubstituted indolinedione with aqueous formaldehyde, generally under reflux conditions in the presence of a suitable water-organic solvent, e.g., an aqueous solution of formaldehyde and methanol, ethanol, isopropanol, dioxane, pyridine, etc. Introduction of other hydroxy-lower alkyl groups onto the ring nitrogen may be accomplished by alkylation of the N-unsubstituted indolinedione with, for example, ethylene oxide or alkylene halohydrin, e.g., ethylene chlorohydrin, propylene chlorohydrin and the like, thereby affording the corresponding β-hydroxyalkyl compounds.

Replacement of the hydroxy function with a halogen is suitably effected by treatment with a sulfur or phosphorous oxyhalide such as, for example, phosphorous oxychloride or, preferably, thionyl chloride, to yield the corresponding halo-lower alkyl substituent in the 2-position of the starting indolinedione.

The starting materials (II) are disclosed in and may be prepared according to the processes described in my copending application Ser. No. 502,329, now Patent No. 3,305,560. In general, they are prepared by reacting a 2-indolinone of Formula III with a phthalaldehydic acid of Formula IV, wherein R', $R_1$ and $R_2$ are as previously described, in the presence of a base such as, for example, an alkali metal hydroxide or lower alkoxide, e.g., sodium hydroxide, potassium hydroxide, sodium ethoxide, potassium tert-butoxide and the like; and tertiary amines such as, for example, trialkylamines, e.g., triethylamine, tributylamine and the like, and saturated heterocyclic amines, e.g., pyridine, N-alkyl piperidine, N-alkyl morpholine, quinoline and the like. The reaction is advantageously carried out in suitable organic solvents such as, for example, lower alkanols, e.g., methanol, tert-butanol and the like; and ethers, e.g., tetrahydrofuran, dioxane, ethylene glycol dimethyl ether and the like. Among the preferred bases and solvents are triethylamine and methanol, respectively. Elevated temperatures may be advantageously employed. The reaction scheme may be illustrated as follows:

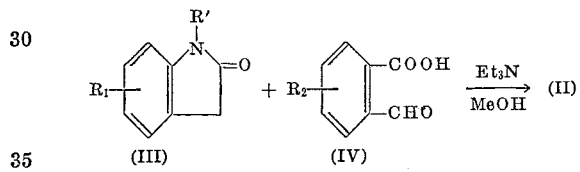

The following examples are intended to illustrate, but not to limit, the scope of the present invention.

EXAMPLE I 1-methyl-3-phthalidyl-2-indolinone (20 g., 0.071 mole) is suspended in 200 g. of polyphosphoric acid at 160° C. The reaction mixture is heated up to 185° C. and kept stirring at this temperature for 5 minutes. The solution is then poured over 1000 g. of ice and water. The resulting solid precipitate is removed by filtration and dissolved in chloroform. The chloroform solution is dried over anhydrous magnesium sulfate and filtered. Removal of the solvent yields an amorphous green material. Crystallization from pyridine affords a green solid, 2-methyl-6H-benzo[5,6]cyclohept[1,2,3-cd]indolin-1,6-dione; M.P. 219–220° C.

Analysis.—Calculated for $C_{17}H_{11}NO_2$: C, 78.15; H, 4.24; N, 5.36%. Found: C, 78.33; H, 4.16; N, 5.54%.

EXAMPLE II

The procedure of Example I is followed except that an equivalent quantity of the 1-ethyl, 1-benzyl, 5-methyl, 5-methoxy, 1,7-dimethyl, 5-chloro, 5-bromo, 1-methyl-5-methoxy, 1-methyl-6-methoxy, 5-hydroxy and 1-methyl-5-chloro derivative, respectively, of 3-phthalidyl-2-indolinone is used in place of the 1-methyl-3-phthalidyl-2-indoline used therein to yield, as respective products, the corresponding 2-ethyl, 2-benzyl, 5-methyl, 5-methoxy, 2,3-dimethyl, 5-chloro, 5-bromo, 2-methyl-5-methoxy, 2-methyl-4-ethoxy, 5-hydroxy and 2-methyl-5-chloro derivative of 6H-benzo[5,6]cyclohept[1,2,3-cd]indolin-1,6-dione.

EXAMPLE III 3-phthalidyl-2-indolinone (1 g., 0.0037 mole) is suspended in 10 g. of polyphosphoric acid at 100° C. The reaction is stirred and heated up to 160° C. at which point the mixture turns dark brown. The reaction temperature is kept at this temperature for 15 min. The viscous material is poured over 100 g. of ice and water. A green solid precipitates and is filtered and dried yielding a crystalline solid, M.P. 327–328° C. The material is recrystallized twice from dimethylformamide giving pure 6H - benzo[5,6]cyclohept[1,2,3-cd]indolin - 1,6 - dione, M.P. 334–335° C.

EXAMPLE IV

In accordance with the procedure of Example III, except that an equivalent quantity of 3-(6'-chloro-phthalidyl) - 2 - indolinone, 3 - (5' - methoxy - phthalidyl) - 2-indolinone, 1-ethyl-3-(4'-methoxy-phthalidyl)-2-indolinone, 1-benzyl-3-(6'-chloro-phthalidyl)-2-indolinone, 5-chloro-3-(6'-methoxy-phthalidyl)-2-indolinone, 1-ethyl-3-(6'-chloro-phthalidyl)-2-indolinone, 6-methyl-3-(5'-methoxy - phthalidyl) - 2 - indolinone, 5 - methoxy - 3 - 4'-methoxy-phthalidyl)-2-indolinone, 5 - hydroxy-3-(5'-methoxy-phthalidyl)-2-indolinone, 1-methyl-5-chloro-3-(4'-methoxy - phthalidyl) - 2 - indolinone, and 1 - methyl - 6-ethoxy-3-(6'-chloro-phthalidyl)-2-indolinone, respectively, is used in place of the 3-phthalidyl-2-indolinone used therein, there are obtained, as respective products, the 8-chloro, 9-methoxy, 2-ethyl-10-methoxy, 2-benzyl-8-chloro, 5-chloro-8-methoxy, 2-ethyl-8-chloro, 4-methyl-9-methoxy, 5,10-dimethoxy, 5-hydroxy-9-methoxy, 2-methyl-5-chloro-10-methoxy, and 2-methyl-4-ethoxy-8-chloro derivative of 6H-benzo[5,6]-cyclohept[1,2,3-cd]indolin-1,6-dione.

EXAMPLE V 6H-benzo[5,6]cyclohept[1,2,3-cd]indolin-1,6-dione (20 g., 0.08 mole) is suspended in 500 ml. of dimethylformamide. To the suspension is added 4.3 g., (0.088 mole) of 50% sodium hydride in mineral oil. The dark red reaction is stirred at room temperature for 4 hours. Thirty-eight grams (0.076 mole) of dimethylaminopropyl chloride is added and the reaction is stirred overnight at room temperature. An additional 20 g. of dimethylaminopropyl chloride is added and the reaction is stirred at room temperature for 90 hours. Acetone is added causing a yellow solid to precipitate. The solid is removed by filtration and the filtrate is evaporated in vacuo. The combined solid and residue are suspended in chloroform and extracted with 4 N hydrochloric acid. The acidic solution is made basic with 10% sodium hydroxide. The alkaline solution is extracted with chloroform. The chloroform solution is dried over anhydrous magnesium sulfate, filtered and evaporated. A crystalline residue is obtained. Recrystallization from cyclohexane yields a yellow solid, 2 - [3 - (dimethylamino)propyl] - 6H - benzo[5,6]cyclohept[1,2,3-cd]indolin-1,6-dione; M.P. 114–115° C.

*Analysis.*—Calculated for $C_{21}H_{20}N_2O_2$: C, 75.88; H, 6.07; N, 8.43%. Found: C, 75.97; H, 5.88; N, 8.18%.

EXAMPLE VI 6H-benzo[5,6]cyclohept[1,2,3-cd]indolin-1,6-dione (20 g., 0.08 mole) is suspended in 300 ml. of dimethylformamide. To the suspension is added 5.80 g. (0.120 mole) of 50% sodium hydride in mineral oil. The dark red reaction mixture is stirred and heated under reflux for 15 minutes. The resulting solution is cooled to room temperature and 29.4 g. (0.32 mole) of freshly distilled dimethylaminoisopropyl chloride is added. The reaction is stirred overnight. A white solid is removed by filtration and the solvent is evaporated in vacuo. The combined solid and residue are suspended in methylene chloride and extracted with 1 N hydrochloric acid. The acidic solution is made basic with sodium bicarbonate and extracted with methylene chloride. The methylene chloride solution is dried over anhydrous magnesium sulfate, filtered and evaporated yielding a brown oil. The oil is dissolved in ethyl acetate and poured through a column of alumina. The solvent is evaporated yielding an oil which crystallizes upon addition of ethyl acetate. The material is recrystallized from ethyl acetate yielding yellow crystals of 2-[(β-dimethylamino-β-methyl)ethyl]-6H-benzo[5,6]cyclohept[1,2,3-cd]indolin-1,6-dione; M.P. 125–127° C.

*Analysis.*—Calculated for $C_{21}H_{20}N_2O_2$: C, 75.88; H, 6.07; N, 8.43%. Found: C, 75.81; H, 6.02; N, 8.42%.

EXAMPLE VII 6H-benzo[5,6]cyclohept[1,2,3-cd]indolin-1,6-dione (1 g., 0.004 mole) is suspended in 15 ml. of xylene. To the suspension is added 0.29 g. (0.006 mole) of 50% sodium hydride in mineral oil. The reaction mixture is stirred and heated under reflux overnight. Dimethylaminoethylchloride hydrochloride (2.3 g., 0.016 mole) is dissolved in sodium bicarbonate solution, extracted with benzene, and the benzene extract is dried over anhydrous magnesium sulfate. The reaction mixture is cooled and the benzene solution of dimethylaminoethylchloride is added. The reaction mixture is heated under reflux overnight. A solid residue is removed by filtration and the filtrate evaporated in vacuo. The combined solid and residue are suspended in chloroform and extracted with 1 N hydrochloric acid. The acidic solution is made basic with soduim bicarbonate and extracted with chloroform. The chloroform extract is dried over anhydrous magnesium sulfate, filtered and evaporated. The yellow residue is crystallized twice from benzene giving 2-[2-(dimethylamino) - ethyl] - 6H - benzo[5,6]cyclohept[1,2,3-cd] indolin-1,6-dione; M.P. 149–150° C.

*Analysis.*—Calculated for $C_{20}H_{18}N_2O_2$: C, 75.45; H, 5.70; N, 8.80%. Found: C, 75.74; H, 5.49; N, 8.91%.

EXAMPLE VIII

In accordance with the procedures outlined in Examples V, VI and VII, and by using an equivalent quantity of the 5-methyl, 5-methoxy, 5-chloro, 8-chloro, 9-methoxy, 5-chloro-8-methoxy and 4-methyl-9-methoxy derivative, respectively, of 6H-benzo[5,6]cyclohept[1,2,3-cd]indolin-1,6-dione in place of the N-unsubstituted indolinone used therein, there are obtained, as respective products, the corresponding 2-[3-(dimethylamino)propyl], 2 [(β - dimethylamino - β - methyl)ethyl] and 2 - [2-(dimethylamino)ethyl] derivatives thereof.

EXAMPLE IX

2 - sodium - 6H - benzo[5,6]cyclohept[1,2,3-cd]indolin-1,6-dione (1 g., 0.0037 mole) is suspended in 15 ml. of dimethylformamide. To this suspension is added 1 ml. of ethylbromoacetate. The reaction is stirred at room temperature for 60 hours. The solvent is evaporated in vacuo. The residue is dissolved in methylene chloride and washed with water. The organic layer is dried over anhydrous magnesium sulfate, filtered, and evaporated in vacuo. The residue is recrystallized from ethyl acetate yielding crystalline ethyl 1,6 - dioxo - 6H - benzo[5,6]cyclohept[1,2,3-cd]-2 indolineacetate; M.P. 212–215° C.

EXAMPLE X

6H - benzo[5,6]cyclohept[1,2,3-cd]indolin - 1,6-dione (1 g., 0.004 mole) is suspended in 15 ml. of dimethylformamide. To this suspension is added 0.5 ml. of 35% sodium hydroxide solution and 1 g. (0.016 mole) of acrylonitrile. The mixture is stirred at room temperature for 60 hours. Insoluble material is removed by filtration and the solvent is evaporated in vacuo. The residue is dissolved in chloroform and the resulting solution is washed with water, dried over anhydrous magnesium sulfate, filtered and evaporated in vacuo. The oily residue is crystallized from ethyl acetate yielding a yellow solid, 2-cyanoethyl - 6H - benzo[5,6]cyclohept[1,2,3-cd]indolin - 1,6-dione.

EXAMPLE XI

By following the procedures outlined in Examples IX and X, and by using an equivalent quantity of the 5-methyl, 5-methoxy, 5-chloro, 8-chloro, 9-methoxy, 5-chloro-8-methoxy and 4-methyl-9-methoxy derivative, respectively, of 6H-benzo-[5,6]-cyclohept[1,2,3-cd]indolin-1,6-dione in place of the N-unsubstituted indolinedione used therein, there are obtained, as respective products, the corresponding 2-ethyl acetate and 2-cyanoethyl derivatives thereof.

EXAMPLE XII

6H - benzo[5,6]cyclohept[1,2,3-cd]indolin - 1,6-dione (11 g., 0.044 mole) is suspended in 50 ml. of dimethylformamide. To this suspension is added 44 ml. of 37% formaldehyde solution and 4.2 ml. of pyridine. The mixture is heated under reflux for 5 min. and then filtered. The filtrate is cooled and water is added very slowly. A yellow solid precipitate is removed by filtration. Recrystallization from dimethylformamide and water yields yellow 2 hydroxymethyl - 6H - benzo[5,6]cyclohept[1,2,3 - cd]indolin-1,6-dione; M.P. 285–287° C.

Analysis.—Calculated for $C_{17}H_{11}NO_3$: C, 73.64; H, 4.00; N, 5.05%. Found: C, 73.61; H, 4.14; N, 5.31%.

EXAMPLE XIII

2 - hydroxymethyl - 6H - benzo[5,6]cyclohept[1,2,3-cd]indolin-1,6-dione (1.6 g., 0.0058 mole) is suspended in 10 ml. of thionyl chloride. The reaction mixture is heated at 50° C. until a clear solution is formed. The reaction mixture is cooled and diluted with ether. The solid is removed by filtration and recrystallized from butyl acetate yielding 2 - chloromethyl - 6H - benzo[5,6]-cyclohept[1,2,3 - cd]indolin - 1,6 - dizone; M.P. 206–207° C.

EXAMPLE XIV

The 2-hydroxymethyl and 2-chloromethyl derivatives, respectively, of each of the 5-methyl-, 5 methoxy-, 5-chloro-, 8-chloro-, 9-methoxy-, 5-chloro-8-methoxy- and 4-methyl-9-methoxy- substituted derivatives of 6H-benzo[5,6]cyclohept-[1,2,3-cd]indolin-1,6-dione are obtained by following the procedures outlined in Examples XII and XIII and by using an equivalent quantity of the appropriate N-unsubstituted indolinedione as the starting material therein.

EXAMPLE XV

6H - benzo[5,6]cyclohept[1,2,3-cd]indolin - 1,6-dione (13 g., 0.052 mole) is suspended in 26 ml. of 37% formaldehyde solution. To this suspension is added 26 ml. of morpholine. The reaction mixture is stirred and heated over a steam bath for 10 min. A solid green precipitate is removed by filtration. The filtrate is extracted with chloroform and the chloroform extract is washed with water, dried over anhydrous magnesium sulfate, filtered and evaporated. The residue is triturated several times with hexane yielding a green solid. Both green solid materials are combined and recrystallized from dimethylformamide yielding crystalline 2 - morpholinylmethyl - 6H - benzo[5,6]cyclohept[1,2,3-cd]indolin - 1,6 - dione; M.P. 194–196° C.

Analysis.—Calculated for $C_{21}H_{18}N_2O_3$: C, 72.82; H, 5.24; N, 8.09%. Found: C, 72.93; H, 5.25; N, 8.11%.

EXAMPLE XVI

6H - benzo[5,6]cyclohept[1,2,3-cd]indolin - 1,6-dione (1 g., 0.004 mole) is suspended in 3 ml. of 37% formaldehyde solution. Two milliliters of pyrrolidine are added and the reaction mixture is heated with stirring on a steam bath. The reaction mixture is cooled and filtered yielding a green solid; M.P. 189–190° C. The solid is recrystallized from ethyl acetate yielding yellow crystals, 2-pyrrolidinylmethyl - 6H - benzo[5,6]cyclohept[1,2,3 - cd]indolin-1,6-dione; M.P. 190–191.5° C.

Analysis.—Calculated for $C_{21}H_{18}N_2O_2$: C, 76.34; H, 5.49; N, 8.48%. Found: C, 76.60; H, 5.66; N, 8.42%.

EXAMPLE XVII

6H - benzo[5,6]cyclohept[1,2,3-cd]indolin - 1,6-dione (1 g., 0.004 mole) is suspended in 3 ml. of 37% formaldehyde solution. To the suspension is added 2 ml. of N-methylpiperazine. The reaction is heated and stirred on a steam bath for 10 min. The cooled solution is extracted with chloroform and the chloroform extract is washed with water and dried over anhydrous magnesium sulfate, filtered, and evaporated in vacuo yielding yellow crystals. Two recrystallizations from ethyl acetate yield a yellow crystalline material, 2 - [(1 - methyl - 4 - piperazinyl)-methyl] - 6H - benzo[5,6]cyclohept[1,2,3 - cd]indolin-1,6-dione; M.P. 183–184° C.

Analysis.—Calculated for $C_{22}H_{21}N_3O_2$: C, 73.51; H, 5.89; N, 11.69%. Found: C, 73.71; H, 5.91; N, 11.55%.

EXAMPLE XVIII

In accordance with the procedures outlined in Examples XV, XVI and XVII, and by using an equivalent quantity of the 5-methyl, 5-methoxy, 5-chloro, 8-chloro, 9-methoxy, 5-chloro-8-methoxy and 4-methyl-9-methoxy derivative, respectively, of 6H - benzo [5,6]cyclohept-[1,2,3-cd]indolin-1,6-dione in place of the N-unsubstituted indolinedione used therein, there are obtained, as respective products, the corresponding 2-morpholinylmethyl, 2-pyrrolidinylmethyl and 2-[(1-methyl-4-piperazinyl)methyl] derivatives thereof.

What is claimed is:

1. 6H-benzo[5,6]cyclohept[1,2,3-cd]indolin-1,6 - dione of the formula:

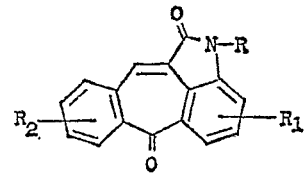

wherein R is a member selected from the group consisting of hydrogen, lower alkyl, benzyl, hydroxy-lower alkyl, halo-lower alkyl, lower alkoxy-carbonyl-lower alkyl, di-lower alkylamino-lower alkyl, morpholino lower alkyl, pyrrolidinyl lower alkyl, piperidino lower alkyl and N'-(lower alkyl)-piperazinyl lower alkyl, and —$CH_2CH_2X$ in which X is a member selected from the group consisting of cyano, amino and lower alkyl-amino; $R_1$ is a member selected from the group consisting of hydrogen, lower alkyl, lower alkoxy, hydroxy and halo; and $R_2$ is a member selected from the group consisting of hydrogen, halo and lower alkoxy; provided that, when $R_1$ is hydroxy, R is a member selected from the group consisting of hydrogen, lower alkyl and benzyl; said lower alkyl and said lower alkoxy having from 1 to 5 carbon atoms.

2. 6H-benzo[5,6]cyclohept[1,2,3-cd]indolin,1-6-dione.

3. 2-lower alkyl - 6H - benzo[5,6]cyclohept[1,2,3-cd]-indolin-1,6-dione, said lower alkyl having from 1 to 5 carbon atoms.

4. 2-methyl - 6H - benzo[5,6]cyclohept[1,2,3-cd]-indolin-1,6-dione.

5. 2-[3-di-(lower alkyl)amino-lower alkyl]-6H-benzo-[5,6]cyclohept[1,2,3-cd]indolin - 1,6 - dione, said lower alkyl having from 1 to 5 carbon atoms.

6. 2-[3-(dimethylamino)propyl] - 6H - benzo[5,6]cyclohept[1,2,3-cd]indolin-1,6-dione.

7. 2-[(β-dimethylamino-β-methyl)ethyl] - 6H - benzo [5,6]cyclohept[1,2,3-cd]indolin-1,6-dione.

8. 2-[2-(dimethylamino)ethyl] - 6H - benzo[5,6]cyclohept[1,2,3-cd]indolin-1,6-dione.

9. Lower alkyl 1,6-dioxo - 6H - benzo[5,6]cyclohept-[1,2,3-cd]-2-indolineacetate, said lower alkyl having from 1 to 5 carbon atoms.

10. Ethyl 1,6-dioxo-6H-benzo[5,6]cyclohept[1,2,3-cd]-2-indolineacetate.

11. 2 - cyanoethyl-6H-benzo[5,6]cyclohept[1,2,3-cd]-indolin-1,6-dione.

12. 2 - hydroxymethyl - 6H - benzo[5,6]cyclohept-[1,2,3-cd]indolin-1,6-dione.

13. 2-chloromethyl-6H-benzo[5,6]cyclohept[1,2,3-cd]-indolin-1,6-dione.

14. 2-morpholinylmethyl - 6H - benzo[5,6]cyclohept-[1,2,3-cd]indolin-1,6-dione.

15. 2-pyrrolidinylmethyl - 6H - benzo[5,6]cyclohept-[1,2,3-cd]indolin-1,6-dione.

16. 2-[(1-lower alkyl-4-piperazinyl)methyl]-6H-benzo-[5,6]cyclohept[1,2,3-cd]indolin-1,6-dione.

17. 2-[(1-methyl-4-piperazinyl)methyl] - 6H - benzo-[5,6]cyclohept[1,2,3-cd]indolin-1,6-dione.

18. A method which comprises cyclodehydrating 3-phthalidyl-2-indolinone of the formula:

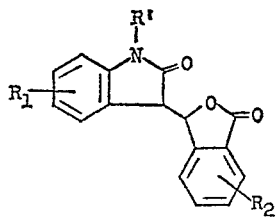

to form 6H-benzo[5,6]cyclohept[1,2,3-cd]indolin - 1,6-dione of the formula:

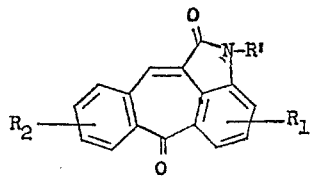

wherein R' is a member selected from the group consisting of hydrogen, lower alkyl and benzyl; $R_1$ is a member selected from the group consisting of hydrogen, lower alkyl, lower alkoxy, hydroxy and halo; and $R_2$ is a member selected from the group consisting of hydrogen, halo and lower alkoxy; said lower alkyl and said lower alkoxy having from 1 to 5 carbon atoms.

19. A method which comprises treating 3-phthalidyl-2-indolinone with polyphosphoric acid at temperatures of about 150–200° C. to form 6H-benzo[5,6]cyclohept-[1,2,3-cd]indolin-1,6-dione.

20. A method which comprises treating 1-(lower alkyl)-3 - phthalidyl-2-indolinone with polyphosphoric acid at temperatures of about 150–200° C. to form 2-(lower alkyl) - 6H - benzo[5,6]cyclohept[1,2,3-cd]indolin-1,6-dione, said lower alkyl having from 1 to 5 carbon atoms.

No references cited.

NICHOLAS S. RIZZO, *Primary Examiner.*

JOSE TOVAR, *Examiner.*

UNITED STATES PATENT OFFICE
CERTIFICATE OF CORRECTION

Patent No. 3,393,208                               July 16, 1968

Janis Plostnieks

It is certified that error appears in the above identified patent and that said Letters Patent are hereby corrected as shown below:

Column 2, line 7, "2-diethylamino)" should read -- 2-(diethylamino) --. Column 4, line 58, "methoxy" should read -- ethoxy --. Column 5, line 13, "4'-" should read -- (4/- --. Column 6, line 51, "2 indolineacetate" should read -- 2-indolineacetate --. Column 7, line 26, "dizone" should read -- dione --. Column 8, line 61, "indolin,1-6-dione" should read -- indolin-1,6-dione --.

Signed and sealed this 16th day of December 1969.

(SEAL)
Att.

Edward M. Fletcher, Jr.                    WILLIAM E. SCHUYLER, JR.
Attesting Officer                                Commissioner of Patents